Oct. 28, 1969  H. LA MERS ET AL  3,475,184
METHOD AND MEANS, FOR PACKAGING FOOD PRODUCTS
Filed Aug. 12, 1968
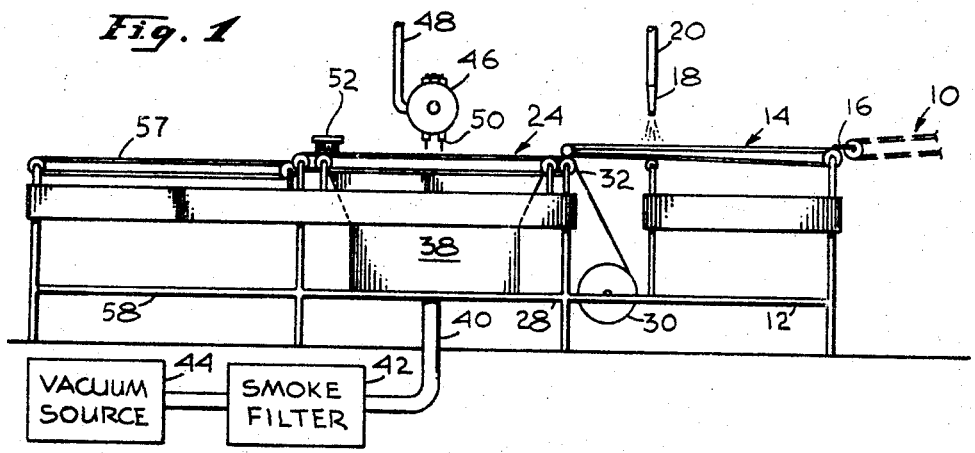
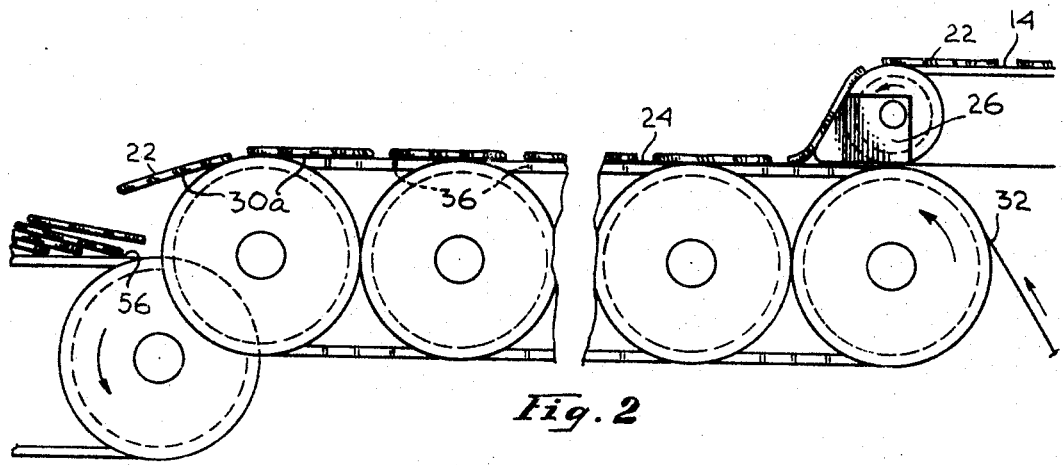
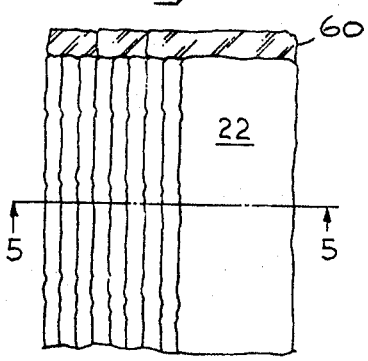
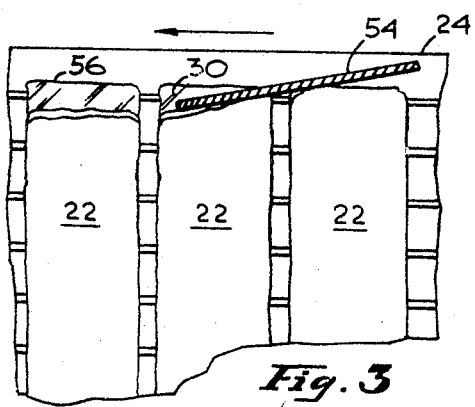
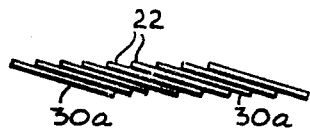
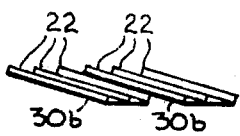
INVENTORS
HERBERT LAMERS
JACK R. GREENLY
BY Samuel Lindenberg
ATTORNEY

# United States Patent Office 3,475,184
Patented Oct. 28, 1969

3,475,184
METHOD AND MEANS FOR PACKAGING FOOD PRODUCTS
Herbert La Mers, Van Nuys, and Jack R. Greenly, Newport Beach, Calif.; said La Mers assignor to said Greenly
Continuation-in-part of application Ser. No. 703,515, Jan. 24, 1968. This application Aug. 12, 1968, Ser. No. 755,763
Int. Cl. B65d 25/06
U.S. Cl. 99—171                 12 Claims

ABSTRACT OF THE DISCLOSURE

An arrangement is provided for packing food slices, wherein slices are spaced on a moving liner material. The food slices and liner material pass under a device which destroys the liner material between the food slices but not the food or the underlying liner material. The food slices thereafter pass by a blade which exposes an underlying tab of the liner material. Thereafter, the food slices are deposited over one another in a desired manner.

This application is a continuation-in-part of an application Ser. No. 703,515, filed Jan. 24, 1968 now abandoned, which was a continuation-in-part of Ser. No. 393,574 filed Sept. 1, 1964 by these inventors, for "Method and Means of Preparing Food Products for Packaging Article Produced Thereby," now abandoned.

BACKGROUND OF THE INVENTION

This invention relates to a unique method and means of preparing a food product for packaging and to the article produced thereby. The invention has particular application to that type of food product which is packaged for vending in a presliced condition for the purpose of facilitating food preparation.

Individuals engaged in the processing of food products for commercial vending to the housewife or other food preparing establishments, have found that the vendability of the product is enhanced when it is packaged for sale in segmented or sliced condition. The housewife or other food preparer may thereby easily select individual portions for serving. Typically, bacon, ham, cheese, a variety of beef products, and many other foods are commercially found in food markets and the like in appropriate containers having a plurality of presliced portions contained therein. The housewife, after purchase of the individual food article, and upon serving merely has to open the package or other container separate the presliced segments, and equal portions are available to her for each table serving. While it is the purpose of such packaging to increase the efficiency of food preparation by eliminating the necessity of "at home" manually slicing individual portions, experience has shown that the prior art modes of prepackaging such articles has produced certain undesirable results. For example, it is commonly known that commercially vended bacon is frequently packaged in one or two pound containers and in a presliced condition. The packages are of such design that individual bacon slices are disposed therein in a shingled condition exposing a longitudinal segment of each slice for purchaser view via a transparent package covering.

This method of packaging has been found to be an attractive mode of product exposition. However, every housewife is provided with a plurality of food portions which are non-uniform in physical configuration, ranging from small slivers to major ragged segments. The difficulty and annoyance in preparing and serving such a partially destroyed article will be obvious to persons engaged in food preparation.

While, in the above example, bacon has been used to illustrate the possible food product fragmentation resulting from prior art packaging techniques of presliced food products, it will readily come to the mind of those using such products that such fragmentation will also occur with many other pre-packaged and sliced articles. For example, ham, beef and cheese are also pre-packaged in a sliced condition. Typically, such articles are congruently stacked rather than arranged in a shingled overlapping condition. Nevertheless, the same difficulties of slice separation and individual piece fragmentation upon separation also occur.

OBJECTS AND SUMMARY OF THE INVENTION

With the above in mind, it is a general object of the invention to provide a novel method of preparing the type of food product hereunder consideration for packaging in such a manner so as to avoid the difficulties heretofore present in prior art packaging modes.

It is a further object of the invention to provide a unique method of arranging food products for appropriate packaging in a presliced condition to render segment selection simple and easy and to preserve the physical continuity of each selected section while maintaining the advantages of packaging in a sliced condition.

It is yet another object of the invention, to provide, as an article of manufacture, a food product in presliced or segmented condition, arranged to render segment selection simple and easy and to preserve the physical continuity of each selected segment.

BRIEF DESCRIPTION OF THE INVENTION

The foregoing objects of the invention are achieved by receiving the slices of the food product and initially acting upon them in such a manner so as to preserve food quality and avoid food spoilage as a result of subsequent process requirements. In a preferred embodiment of the disclosed method, and, considering bacon as a typical example, the individual segments are received from a bacon slicing machine in separated tandem condition and the exposed planar surface of each individual segment is preliminarily coated with water or other protective material which will not contaminate the food product.

Thereafter the individual segments are carried in such a manner as to become sequentially aligned on a substantially continuous sheet of appropriate segment separating material. Upon such appropriate alignment, the material, together with the supported tandemly arranged and separated segments, are conveyed to another station where sufficient heat is applied to eliminate the segment separating material between the segments without affecting the food product. This leaves the separated food segments with individual underlying separating liners of virtually congruent configuration. Thereafter, the now congruently formed combined food segments and separating liners may be further acted upon so as to provide, at at least one terminus of the food segment, a manual manipulating tab of separating material. Thereafter, the combined and tabbed segments are further arranged in predetermined groups appropriate for the desired packaging.

The requirement for the application of a protective coating may be avoided by conditioning the bacon before it reaches the location at which heat is applied. That is, if the bacon is sufficiently cold, the application of the heat to destroy the segment separating material does not effect the bacon, either because of its temperature or because there may be a protective coating deposited on the bacon by virtue of moisture condensation.

With the above in mind, it will also be understood that the herein disclosed invention comprehends the production, as an article of manufacture, of a segmented food product having the segments physically arranged for appropriate packaging with the segments having substantially congruently formed liners maintaining physical separation of the segments. Additionally, each segment is provided with appropriately arranged selection tabs to facilitate segment selection and product serving.

BRIEF DESCRIPTION OF THE DRAWINGS

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a partially schematic side elevational view of a typical arrangement by which the disclosed method may be employed;

FIGURE 2 is a fragmentary side elevational view partially schematically illustrating certain steps in the disclosed process and showing a typical food product during production thereof;

FIGURE 3 is a fragmentary plan view illustrating another step in the herein disclosed method;

FIGURE 4 is a typical plan view of a product produced by the herein disclosed method;

FIGURE 5 is a sectional view taken along line 5—5 of FIGURE 4; and

FIGURE 6 is a sectional view, similar to FIGURE 5, illustrating the flexibility of the herein disclosed method relative to food segment preparation.

DESCRIPTION OF THE PREFERRED EMBODIMENT

Directing attention to FIGURE 1 and describing the invention in detail, the numeral 10 illustrates conventional conveyor equipment employed in prior art methods of production of segmented and packaged food products. The prior art conveyor structure 10 is shown in phantom and it will be understood that it is normally used in association with a commercial slicing device (not shown). The conveyor 10 receives from the slicing device, individual segments or slices of the food product, in tandemly arranged separated sections. Immediately adjacent the conveyor 10 a frame structure 12 supports a second conveyor indicated generally at 14. A segment drop-off plate 16 spans the juncture of the conveyors 10 and 14 and accommodates disposition of the segmented product on the conveyor 14, again in spaced tandem arrangement. The lineal surface speed of conveyor 14 relative to the speed of conveyor 10 controls product spacing and disposition thereon. For example, the conveyor 14 may be operated at a lineal speed equivalent to the speed of the conveyor 10, and, individual segments on conveyor 14 will be separated by substantially the same distance as the segmented product appearing on conveyor 10. If it is desired that individual product segments on conveyor 14 be separated a greater distance than on conveyor 10, it is merely necessary to increase the lineal surface speed of the conveyor 14 relative to conveyor 10. Further, the lineal surface speed of conveyor 14 may be intermittently varied to provide product segment separation by groups.

With reference to the mentioned conveyor speed control, it will be noted that conventional drive mechanisms (not shown) may be employed to power the respective conveyors. With this in mind, those skilled in the art will readily understand that relative and controllable conveyor speeds may be provided as well as appropriate and conventional drive mechanisms.

Immediately above the product carrying surface of the conveyor 14, a preferred embodiment of the invention provides a nozzle 18, said nozzle being connected via line 20 to a source of product protecting material, such as a water reservoir, (not shown). As will become more clear, as this explanation progresses, a property of the food product protecting material is that it must be able to protect the food product against the effects of heat which is applied for a short time interval and also must have no adverse effect on the food product. Assuming that the product herein being acted upon is sliced bacon, as above typically described, a satisfactory product protecting material would be water. Thus, the nozzle 18 and connected line 20 is arranged to provide a very fine mist or spray of water immediately above the surface of the conveyor 14. Accordingly, as each individual bacon segment is moved under the nozzle 18, the upper or exposed surface thereof is completely coated with a thin film of water. The film provided is sufficiently heavy to avoid evaporation before the completion of the various steps of the process.

In the fragmentary schematic view of FIGURE 2, the conveyor 14 is shown at the righthand position thereof. The numeral 22, is illustrative of a plurality of tandemly arranged bacon slices being carried by the conveyor 14. The lefthand terminus of conveyor 14 is in elevated relationship to a second conveyor, indicated generally at 24. Stripping structure 26 assures removal of each individual sliced segment 22 from conveyor 14 and accommodates gravity disposition thereof downwardly toward the surface of the conveyor 24.

As shown in FIGURE 1, conveyor 24 is provided with supporting structure shown at 28. The structure 28 also accommodates journal support of a continuous roll of planar separating material, indicated generally at 30. The separating material 30 may be any one of a variety of readily commercially available products. Desirably, the separating or liner material used should be economical, flexible, safe for use in contact with food product and have a low surface frictional coefficient so as not to readily adhere to the surface of the processed product. It is also required to be heat destructible. Typical examples of an appropriate material are a plastic material such as thin sheet polyethylene, cellophane, a lightly waxed or otherwise surface-treated paper, or, perhaps even untreated paper depending upon the product with which it is to be associated.

For illustrative purposes, it will be assumed that the heat destructible separating material of roll 30 is polyethylene. A sheet material is fed upwardly from the roll 30 and intermediate the juncture between conveyor 14 and conveyor 24 as at 32. The sheet material is arranged to be over the surface of the conveyor 24 for continuous movement therewith. To maintain continuity and concurrent travel between the surface of the conveyor 24 and the polyethylene sheet disposed thereon, the surface of the conveyor 24 is appropriately uniformly apertured as at 36, 36 (FIGURE 2). Below the conveyor 24, and supported by the structure 28, a conventional vacuum head 38 having an upwardly directed opening is positioned. The head 38 communicates with a flue 40, the latter having a filter 42 in series relation therein. A conventional vacuum source 44, which exhausts to atmosphere, communicates with the flue 40 and provides for the vacuuming low pressure to the head 38. Because of the fact that the vacuum head 38 is substantially coextensive with a horizontal planar configuration of the conveyor 24, the vacuum pressure provided thereby maintains the sheet of polyethylene film in position on, and substantially coextensive with, the upper surface of the conveyor 24 over apertures 36.

Directing attention to FIGURE 2, it will be seen that the individual product segments 22 are stripped from the conveyor 14 and gravity deposited downwardly toward the conveyor 24 and positioned upon the surface of the polyethylene film 30. In the disclosed embodiment, the strips 22 are positioned on the film 30 and conveyor 24 in tandem slightly separated relationship as received from conveyor 14.

Immediately above the surface of conveyor 24 and preferably centrally thereof, a burning device, indicated generally at 46, is positioned. In the preferred embodiment of the invention, the burning device 46 is gas-fired and is supplied via line 48 from a conventional gas source (not shown). The device 46 may be provided with a plurality of downwardly directed flame jets 50, 50, whereby a virtually continuous open flame is directed to the surface of the conveyor 24 and transversely across same as shown in FIGURE 1. Thus, at the device 46, a transverse segment of the conveyor 24 as well as a plastic material sheet 30 and carried product segments 22, are continuously bathed in an open flame as they move under the device 46.

The liner material used should be heat destructible and thus is subject to rapid destruction by the open flame. It will also be recalled that in an earlier described step of the disclosed method, the individual upwardly directed surfaces of the segmented and tandemly arranged food product were covered with a thin film of protective material such as the water described. With these two facts in mind, it will become obvious that, as the film 30 is moved under the gas device 46, both the product and film is bathed in open flame and the exposed sections of the film surrounding the tandemly arranged product segments will be instantly completely destroyed. Any ash product residue therefrom and any smoke is removed from the surface of the conveyor 24 by the vacuuming action of the head 38 over apertures 36. The thin film of protective fluid on the exposed surfaces of the product segments 22 effectively prevents the open flame from affecting the food product for the short time interval required for removing the liner surrounding each food product during which the surface of each segment is exposed to said open flame. It will be understood that the linear speed of the conveyor 24 must be programmed to avoid flame penetration of the protective film and attack of the surface of the food product.

By way of illustration and not to be construed as a limitation upon the invention, a commercial bacon slicer delivered bacon at the rate of 1200 slices per minute to a conveyor 24. The conveyor speed was at 2.5 ft./sec. However, variations over the range between 2.5–3⅓ ft./sec. were used and operated successfully. A polyethylene sheet having a ½ mil thickness was used. However a range in the thicknesses from ½ to 1 mil was successfully used for the liner. The temperature of the gas flame was on the order of 1500° C. The polyethylene destruct temperature was about 500° F. The flame tip was on the order of 1 inch away from the moving and protected food product.

There is no real criticality in the parameters of this apparatus other than that the heat source should not be applied in a manner or over an interval to adversely affect the food product through the protective coating or in a manner, or over an interval to adversely affect the food product through the protective coating, or in a manner or over an interval so that the liner is not destroyed. Obviously the protective covering should not burn under the heat of the flame. Therefore, should inspection show that the heat source is adversely affecting the food product, it may be moved away from the conveyor or the conveyor may be speeded up. Should inspection show the liner is not being destroyed then the burning device may be brought closer, or the conveyor slowed up, or more burning devices may be added. The adjustments are simple and may be made visually or calculated from a knowledge of the properties of the proposed liner material and the temperature available from the heat source.

After exposure to the burning device 46, each product segment will have on the underside thereof a thin layer of polyethylene film which is virtually exactly congruently formed to the peripheral configuration of each segmented food product regardless of how erratically formed it is, and covers the entire underside surface thereof. The importance of this feature will hereinafter be described in detail.

A tabbing structure, indicated generally at 52, is carried by the frame 28 in appropriate physical relation to the lefthand terminus of conveyor 24, and immediately above the upwardly directed surface thereof. The tabbing structure 52, as shown in FIGURE 3, comprises a downwardly directed peeling blade 54 carried in slight angular relation to the longitudinal direction of the motion of conveyor 24 and immediately adjacent a side edge thereof. The lower terminus of the peeling blade 54 is carried immediately above the surface of the conveyor 24 and in edge-interfering relationship with the adjacent ends of the segmented product carried on the conveyor 24. It will thus be understood that the tabbing structure 52 and particularly the peeling blade 54 thereof, rolls or peels inwardly a marginal edge of each product segment 22 exposing therebelow a tab end 56 of the now segmented polyethylene separating strip 30.

Another conveyor 57 supported by frame structure 58, is positioned immediately adjacent and to the left of conveyor 24. The upper surface of conveyor 57 is below the upper surface of conveyor 24. The upper surface of conveyor 57 is arranged to receive the now combined product segments 22 and liners 30a as conveyor 24 reaches its lefthand terminus. The described disposition of the combined segments is clearly shown in the fragmentary schematic view of FIGURE 2. Conveyor 57 may be powered by any conventional driving mechanism. However, it will be understood that the surface speed of conveyor 57 should be carefully controlled relative to the surface speed of conveyor 24. For example, if the surface speed of conveyor 57 is slower than the surface speed of conveyor 24, the individual combined segments of product 22 and liners 30a will be arranged in overlapping shingle relationship as shown in FIGURE 2. Such relationship is desirable, for example, in bacon packaging. When sufficient slices are shingle deposited on the surface of conveyor 57 for final packaging, the speed of conveyor 57 may be incrementally increased for a short period of time to accommodate separation of the sliced product in group increments. On the other hand, if it is desired to stack a predetermined number of product segment slices congruently, the conveyor 57 may be halted for that period of time relative to the motion of conveyor 24 as will accommodate the disposition thereon of the required number of slices. At that point in time, conveyor 57 may be linearly jogged so that individual packaged units will be deposited thereon and ready for final enclosure.

In the foregoing description it has been indicated that the product segment slices are coated with a protective coating, such as water, prior to being moved under the burning device. However, this is not required where the temperature of the food product is so low that it will be relatively unaffected by the burning device for the short interval of exposure at its outer edges which is required to eliminate the separating liner material. It should be observed that the low temperature food product can cause some moisture condensation over the surface thereof thereby probably inherently providing a protective coating. The temperature at which meat is processed in meat packing houses, which is under 60° F. has been found to be satisfactory. Also some food products which are at freezing temperatures at around 32° F. also do not require a protective coating.

In those instances where the slight effect on the food product of the short exposure to the burning device is of no consequence or concern or even where a slight cooking is desirable obviously the requirement for the preliminary application of the protective coating may be eliminated. In those instances, and also in the instances where the low temperature of the food product provides the required protection, the appearance of the processing apparatus is the same as is shown in FIGURE 1, except that the spraying equipment 18, 20 is eliminated.

FIGURES 4 and 5 are illustrative of a typical food product prepared by the disclosed method for packaging in the sliced or segmented condition. For illustrative purposes, sliced bacon is shown. Particular note should be given the fact that the respective bacon slices are physically arranged in virtually uniform overlapping shingled relationship and that a tab end 60 is provided at an edge of each slice that may be easily finger-gripped to remove a single slice from the package. Further, each product segment has provided, on the lower surface thereof, and covering the entire lower surface, a thin section of polyethylene separating liner material substantially congruently or identically formed to the planar configuration of its supported product segment. Thus, uniform and entire separation of each segment from the adjacent product segment is assured. The congruent conformation of each separating polyethylene liner relative to its related product segment is of extreme importance. It assures proper product exposure for viewing by the consumer prior to purchase. Further, each product segment, or bacon strip, may be easily removed by manually gripping the tab ends 60 and lifting the related product from the package. The housewife, therefore, can easily and quickly select the number of strips desired. Additionally, the total and complete separation of the respective product segments or strips offered by the congruently formed liners, assures that each selected strip or segment will be totally removed from the package without semi-destruction or fragmentation. The extremely low coefficient of friction existing between the product segment per se and the separating liner affords easy separation of the strip from the product prior to food preparation.

FIGURE 6 is an elevational view similar to FIGURE 5 and illustrating an alternate form of prepackaging. Here it will be noted that a plurality of product segments 22 are carried by each separating strip 30b rather than individual product segments. In some applications, it may be desirable to package the product in this manner. To achieve the segment strip relationship illustrated in FIGURE 6, it will be recalled that it is merely necessary to incrementally and controllably vary the linear surface speed of the conveyor 14 relative to the conveyor 10 so that three product strips are positioned on the surface of the conveyor 14 in overlapping shingled relationship. Thereafter groups of three product segments are carried in tandem spaced relationship on said conveyor 14 prior to receiving the precoating accomplished by nozzle 18. As noted above, these alternates are for illustrative purposes only and that any desired product relationship may be provided merely by appropriately controlling the relative surface speeds of the various conveyors above described.

To summarize, the method and means of this invention comprises, whenever it is required, applying a protective covering to each of a stream of food product segments which are then moved onto a conveyor covered with a heat destructible liner material. The protective covering should protect each food product segment against the effects of heat which is to be applied to destroy the liner material between the food product segments. A heating or burning device is used for this purpose. The liner should be heat destructible. The food product segments are moved under the burning device and thereafter onto another and slower moving conveyor which stacks the food product in a desired manner. Before reaching this conveyor however provision is made for a tab on each food product segment by pushing back a tap segment thereof. The food products used, as previously indicated may be meats such as bacon, ham, etc., or cheese slices, or any other sliced food product not affected by the slight elevation in temperature which occurs during the process of destroying the liner.

The disclosed invention provides a novel method and means of arranging presliced food products for commercially attractive packaging. Additionally, a unique article of packaged food is produced which preserves for both the vendor and the purchaser, the highly desirable visual selective features of such packaging while eliminating the undesired features of difficult slice selection and product fragmentation.

There has accordingly been described and shown herein a novel and useful method and means for packaging sliced foods to afford easy separability of individual slices.

What is claimed is:

1. In a method of preparing a sliced or segmented food product for packaging wherein the package segments are arranged in overlying relation to each other, the steps of lowering the temperature of product segments to a value at which it will be unaffected by the subsequent application thereto of burning heat, providing conveying means for reception of product segments in spaced relation to each other,
   moving said product segments in spaced relationship with one another onto a sheet of heat destructible liner material,
   applying burning heat to the product segments and to the liner material exposed between each product segment to destroy the liner material while leaving the product segment unaffected whereby a section of liner material is congruently formed to the peripheral configuration of each product segment, and
   moving the respective product segments and the congruently formed liner sections to assume a predetermined overlying relation with each other.

2. In a method of preparing a sliced or segmented food product as recited in claim 1 wherein during the application of burning heat to said product segments and liner material a vacuum is applied to the back of said liner material to remove any ash which may be formed.

3. In a method of preparing a sliced or segmented food product as recited in claim 1 wherein said step of applying burning heat to the product segments and the liner material comprises applying an open flame thereto to destroy said liner material but to leave said product segment unaffected.

4. In a method of preparing a sliced or segmented food product for packaging wherein the package segments are arranged in overlying relation to each other, the steps of
   providing conveying means for reception of product segments in spaced relation to each other,
   moving said spaced segments to a film coating means location,
   coating the exposed surfaces of said spaced segments with water,
   moving the coated product segments in spaced relationship with one another on to a sheet of heat destructible liner material,
   applying burning heat to the coated product segments and to the liner material exposed between each product segment to destroy the liner material while leaving the coated product segment unaffected whereby a section of liner material is congruently formed to the peripheral configuration of each product segment, and
   moving the respective product segments and the congruently formed liner sections to assume a predetermined overlying relationship to each other.

5. A method of preparing a sliced or segmented food product for packaging wherein the package segments are arranged in overlying relation to each other according to claim 4, wherein said step of applying burning heat to the coated product segments and the liner material comprises applying an open flame thereto to destroy said liner material but to leave said product segments unaffected.

6. A method of preparing a sliced segmented or sliced food product for packaging wherein the segments are arranged in overlying relation to each other according to claim 4, wherein there is included the step of peeling from an edge a small portion of the product segment from adjacent said congruently formed liner material to provide a finger gripping tab of said liner material.

7. A method of preparing segmented or sliced food products for packaging wherein the segments are arranged in overlying relation to each other as recited in claim 4, wherein during the step of applying burning heat to the coated product segments and liner material a vacuum is applied to the back of said liner material to remove any ash which may be formed.

8. In a method of preparing a sliced or segmented food product for packaging wherein the package segments are arranged in overlying relation to each other, the steps of
providing conveying means for reception of product segments in spaced relation to each other,
moving said spaced segments to a film coating means location,
coating the exposed surfaces of said spaced segments with water,
moving the coated product segments onto a sheet of heat destructible plastic material in spaced relationship to each other,
moving the liner material and supported product segments to a liner material destroying location,
applying the heat of an open flame to the coated product segments and the liner material exposed between each product segment to destroy the liner material and leave the coated product segment unaffected whereby a section of liner material is congruently formed to the peripheral configuration of each product segment,
applying a vacuum to the side of said liner material opposite to the one on which said product segment is placed to remove said destroyed liner material,
peeling a small portion of the product segment from adjacent said congruently formed liner material to provide a finger gripping tab of said liner material, and
moving the respective product segments and the congruently formed liner sections to assume a predetermined overlying relationship to each other.

9. Apparatus for lining a side of a food product of the type delivered as individual slices for packaging comprising:
means for reducing the temperature of individual slices to a value at which it is unaffected by the subsequent application thereto of burning heat,
a sheet of heat destructible liner material;
means for laying said individual slices separated from each other over the surface of said sheet;
burning heat source means for destroying all of the sheet of heat destructible liner material around and between each individual slice except that which is covered by an individual slice to leave each slice unaffected and to provide individually lined slices;
vacuum means for removing any ash resulting from destroying liner material; and
means for packaging said individually lined slices in a predetermined manner.

10. Apparatus for lining a side of a food product of the type delivered as individual slices for packaging comprising:
a source of water;
means for applying a coating of water from said source over each of said individual slices;
a sheet of heat destructible liner material;
means for laying said coated individual slices separated from each other over the surface of said sheet;
burning heat source means for destroying all of the sheet of heat destructible liner material around and between each coated individual slice except that which is covered by an individual slice to leave each slice unaffected and to provide individually lined slices;
vacuum means for removing any ash resulting from destroyed liner material; and
means for packaging said individually lined slices in a predetermined manner.

11. Apparatus for lining the side of a food product for packaging in the form of overlapping slices of said food product comprising:
means for spacing individual slices of said food product from one another;
a water reservoir;
means for spraying a coating of water from said reservoir over each of said individual slices;
a sheet of heat destructible plastic liner;
means for placing said coated individual slices spaced from one another over said sheet of heat destructible plastic liner;
flame heat source means for destroying said heat destructible liner;
means for moving said coated individual slices on said sheet of heat destructible plastic liner past said flame heat source means for destroying said heat destructible liner in all regions between said coated individual slices to leave each slice unaffected and to leave a congruent layer of said liner wherever it is covered by said slices;
means for exposing a tab portion of said congruent layer of said liner on each individual slice; and
means for packaging said individual slices which have a tab portion exposed.

12. Apparatus for lining the side of a food product for packaging in the form of overlapping slices of said food product comprising:
means for reducing the temperature of individual slices to a value at which it is unaffected by the subsequent application thereto of burning heat,
means for spacing individual slices of said food product from one another;
a sheet of heat destructible plastic liner;
means for placing said individual slices spaced from one another over said sheet of heat destructible plastic liner;
flame heat source means for destroying said heat destructible liner;
means for moving said individual slices on said sheet of heat destructible plastic liner past said flame heat source means for destroying said heat destructible liner in all regions between said individual slices to leave a congruent layer of said liner wherever it is covered by said slices and to leave said individual slices unaffected;
means for exposing a tab portion of said congruent layer of said liner on each individual slice; and
means for packaging said individual slices which have a tab portion exposed.

References Cited

UNITED STATES PATENTS

| 2,684,905 | 7/1954 | Grindrod | 99—178 |
| 2,980,542 | 4/1961 | Nusbaum | 99—178 |

HYMAN LORD, Primary Examiner

U.S. Cl. X.R.

53—21, 167; 99—174, 178